United States Patent
Yan et al.

(10) Patent No.: US 10,902,768 B2
(45) Date of Patent: Jan. 26, 2021

(54) BACKLIGHT ADJUSTMENT METHOD AND BACKLIGHT ADJUSTMENT SYSTEM FOR COMPENSATING BACKLIGHT BRIGHTNESS OF DISPLAY DEVICE BY ADJUSTING BACKLIGHT COEFFICIENT OF THE DISPLAY DEVICE ACCORDING TO BRIGHTNESS COMPENSATION COEFFICIENT

(71) Applicants: K-TRONICS (SUZHOU) TECHNOLOGY CO., LTD., Jiangsu (CN); BOE TECHNOLOGY GROUP CO., LTD., Beijing (CN)

(72) Inventors: Zhihao Yan, Beijing (CN); Rong Shen, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/337,122

(22) PCT Filed: Jul. 13, 2018

(86) PCT No.: PCT/CN2018/095612
§ 371 (c)(1),
(2) Date: Mar. 27, 2019

(87) PCT Pub. No.: WO2019/052276
PCT Pub. Date: Mar. 21, 2019

(65) Prior Publication Data
US 2019/0221156 A1    Jul. 18, 2019

(30) Foreign Application Priority Data
Sep. 12, 2017 (CN) .......................... 2017 1 0818578

(51) Int. Cl.
*G09G 3/20* (2006.01)
*G09G 3/22* (2006.01)
(Continued)

(52) U.S. Cl.
CPC ......... *G09G 3/22* (2013.01); *G02F 1/133602* (2013.01); *G09G 3/2003* (2013.01);
(Continued)

(58) Field of Classification Search
CPC ...... G09G 3/22; G09G 3/3406; G09G 3/2003; G09G 2360/16; G09G 2360/144;
(Continued)

(56) References Cited

U.S. PATENT DOCUMENTS 9,177,507 B2 *  11/2015  Wei ...................... G09G 3/3406
9,214,111 B2 *  12/2015  Watanabe ................ G09G 3/36
(Continued)

FOREIGN PATENT DOCUMENTS

CN    102097056 A    6/2011
CN    102141435 A    8/2011
(Continued)

OTHER PUBLICATIONS

International Search Report and Written Opinion dated Oct. 24, 2018; PCT/CN2018/095612.
(Continued)

*Primary Examiner* — Ryan A Lubit (57) ABSTRACT

A backlight adjustment method and a backlight adjustment system are provided. The backlight adjustment method includes a compensation phase. The compensation phase includes: controlling a light source to respectively emit light having a plurality of first illuminations; detecting a plurality of backlight parameters of a display device under the light having the plurality of first illuminations, and calculating a brightness compensation coefficient of the display device
(Continued)

according to the plurality of backlight parameters; and adjusting a backlight coefficient of the display device according to the brightness compensation coefficient, so as to compensate for backlight brightness of the display device.

20 Claims, 4 Drawing Sheets

(51) Int. Cl.
  *G02F 1/13357* (2006.01)
  *G09G 3/34* (2006.01)
  *G09G 5/10* (2006.01)

(52) U.S. Cl.
  CPC ............ *G09G 3/3406* (2013.01); *G09G 5/10* (2013.01); *G09G 2320/0233* (2013.01); *G09G 2320/0242* (2013.01); *G09G 2320/0626* (2013.01); *G09G 2320/0666* (2013.01); *G09G 2360/14* (2013.01); *G09G 2360/144* (2013.01); *G09G 2360/16* (2013.01)

(58) Field of Classification Search
  CPC ....... G09G 2360/14; G09G 2320/0242; G09G 2320/0666; G09G 2320/0626; G09G 2320/0233
  See application file for complete search history.

(56) References Cited

U.S. PATENT DOCUMENTS

| | | | | |
|---|---|---|---|---|
| 9,478,173 | B2* | 10/2016 | Safaee-Rad | H04N 9/69 |
| 2009/0167672 | A1* | 7/2009 | Kerofsky | G09G 3/3413 345/102 |
| 2013/0201223 | A1* | 8/2013 | Li | G09G 3/3225 345/690 |
| 2013/0328944 | A1* | 12/2013 | Barnhoefer | G09G 3/006 345/690 |
| 2015/0332634 | A1* | 11/2015 | Xu | G09G 3/3648 345/690 |
| 2017/0206862 | A1* | 7/2017 | Jha | G06F 1/3231 |
| 2019/0057659 | A1* | 2/2019 | Lin | G09G 3/3406 |
| 2019/0108797 | A1* | 4/2019 | Zhang | G09G 3/3426 |
| 2019/0221156 | A1 | 7/2019 | Yan et al. | |

FOREIGN PATENT DOCUMENTS

| | | |
|---|---|---|
| CN | 102915706 A | 2/2013 |
| CN | 104143320 A | 11/2014 |
| CN | 104200782 A | 12/2014 |
| CN | 104488019 A | 4/2015 |
| CN | 105741787 A | 7/2016 |
| CN | 106157904 A | 11/2016 |
| CN | 106448616 A | 2/2017 |
| CN | 107564479 A | 1/2018 |
| CN | 107845366 A | 3/2018 |

OTHER PUBLICATIONS

The First Chinese Office Action dated Mar. 13, 2019; Appln. No. 201710818578.1.
The Second Chinese Office Action dated Sep. 26, 2019; Appln. No. 201710818578.1.

* cited by examiner

BACKLIGHT ADJUSTMENT METHOD AND BACKLIGHT ADJUSTMENT SYSTEM FOR COMPENSATING BACKLIGHT BRIGHTNESS OF DISPLAY DEVICE BY ADJUSTING BACKLIGHT COEFFICIENT OF THE DISPLAY DEVICE ACCORDING TO BRIGHTNESS COMPENSATION COEFFICIENT

The application claims priority to Chinese patent application No. 201710818578.1, filed on Sep. 12, 2017, the entire disclosure of which is incorporated herein by reference as part of the present application.

TECHNICAL FIELD

At least one embodiment of the present disclosure relates to a backlight adjustment method and a backlight adjustment system.

BACKGROUND

Liquid crystal display (LCD) devices have advantages of long life, low power consumption, low operating voltage, high color rendering index, fast response speed, environmental protection, small size, low radiation, and so on, and have been widely used in electronic devices, such as notebook computers, mobile phones, liquid crystal televisions and so on. A liquid crystal display device is a passive light emitting device, which mainly comprises a liquid crystal display panel and a backlight source. The liquid crystal display panel itself does not emit light, but relies on the backlight source to provide a light source therefor. In order to reduce the power consumption of the liquid crystal display device and improve the display contrast, a liquid crystal display device having a backlight brightness adjustment function has been gradually developed. The liquid crystal display device having the backlight brightness adjustment function can adjust the backlight brightness of the backlight source according to ambient light, and therefore adjust the display brightness of the liquid crystal display panel.

SUMMARY

At least one embodiment of the present disclosure provides a backlight adjustment method, which comprises a compensation phase, the compensation phase comprises: controlling a light source to respectively emit light having a plurality of first illuminations; detecting a plurality of backlight parameters of a display device under the light having the plurality of first illuminations, and calculating a brightness compensation coefficient of the display device according to the plurality of backlight parameters; and adjusting a backlight coefficient of the display device according to the brightness compensation coefficient, so as to compensate for backlight brightness of the display device.

For example, in the backlight adjustment method provided by at least one embodiment of the present disclosure, the display device comprises a light sensor, and the backlight adjustment method comprises: respectively detecting, by the light sensor, a plurality of actual illuminance sample values of the display device under the light having the plurality of first illuminations, the plurality of backlight parameters comprising the plurality of actual illuminance sample values; calculating a compensation proportional coefficient of the plurality of first illuminations and the plurality of actual illuminance sample values; and calculating a photosensitive compensation coefficient of the light sensor according to a conversion coefficient of the light sensor and the compensation proportional coefficient, the brightness compensation coefficient comprising the photosensitive compensation coefficient.

For example, in the backlight adjustment method provided by at least one embodiment of the present disclosure, the backlight coefficient of the display device comprises the conversion coefficient of the light sensor, and the backlight adjustment method comprises: adjusting the conversion coefficient of the light sensor according to the photosensitive compensation coefficient, so as to compensate for the backlight brightness of the display device.

For example, in the backlight adjustment method provided by at least one embodiment of the present disclosure, detecting a plurality of first actual backlight brightness of the display device under the light having the plurality of first illuminations, the plurality of first actual backlight brightness being the plurality of backlight parameters; obtaining a plurality of first theoretical backlight brightness of the display device corresponding to the light having the plurality of first illuminations; and calculating a backlight compensation coefficient of the display device according to the plurality of first actual backlight brightness and the plurality of first theoretical backlight brightness, the backlight compensation coefficient being the brightness compensation coefficient.

For example, in the backlight adjustment method provided by at least one embodiment of the present disclosure, the display device comprises a backlight source, the backlight coefficient of the display device comprises a duty ratio of the backlight source. The backlight adjustment method comprises: adjusting the duty ratio of the backlight source according to the backlight compensation coefficient, so as to compensate for the backlight brightness of the display device.

For example, in the backlight adjustment method provided by at least one embodiment of the present disclosure, the backlight adjustment method further comprises a detection phase before the compensation phase. The detection phase comprises: controlling the light source to emit light having a second illumination; obtaining second theoretical backlight brightness of the display device corresponding to the light having the second illumination; detecting second actual backlight brightness of the display device under the light having the second illumination; calculating an absolute difference between the second theoretical backlight brightness and the second actual backlight brightness; and judging whether the absolute difference is greater than a backlight error threshold, and where the absolute difference is greater than the backlight error threshold, performing the compensation phase.

For example, in the backlight adjustment method provided by at least one embodiment of the present disclosure, the brightness compensation coefficient is stored in a non-volatile memory of the display device.

At least one embodiment of the present disclosure provides a backlight adjustment system, comprising a light source, a backlight detection device, an illuminance detection device, a control device, and a calculation device. The illuminance detection device is configured to detect an illumination of light emitted by the light source; the control device is configured to control the light source to respectively emit light having a plurality of first illuminations; the backlight detection device is configured to detect a plurality of backlight parameters of a display device under the light having the plurality of first illuminations; the calculation device is configured to calculate a brightness compensation coefficient of the display device according to the plurality of backlight parameters; and the controller of the display device is configured to adjust a backlight coefficient of the display device according to the brightness compensation coefficient, so as to compensate for backlight brightness of the display device.

For example, in the backlight adjustment system provided by at least one embodiment of the present disclosure, the display device comprises a light sensor, and the backlight detection device comprises the light sensor. The light sensor is configured to respectively detect a plurality of actual illuminance sample values of the display device under the light having the plurality of first illuminations. The plurality of actual illuminance sample values are the plurality of backlight parameters. The calculation device is further configured to calculate a compensation proportional coefficient of the plurality of first illuminations and the plurality of actual illuminance sample values; and calculate a photosensitive compensation coefficient of the light sensor according to a conversion coefficient of the light sensor and the compensation proportional coefficient. The photosensitive compensation coefficient being the brightness compensation coefficient.

For example, in the backlight adjustment system provided by at least one embodiment of the present disclosure, the backlight coefficient of the display device comprises the conversion coefficient of the light sensor, and the controller of the display device is configured to adjust the conversion coefficient of the light sensor according to the photosensitive compensation coefficient, so as to compensate for the backlight brightness of the display device.

For example, in the backlight adjustment system provided by at least one embodiment of the present disclosure, the backlight detection device comprises a color analyzer, the color analyzer is configured to detect a plurality of first actual backlight brightness of the display device under the light having the plurality of first illuminations, the plurality of first actual backlight brightness is the plurality of backlight parameters. The calculation device is configured to acquire a plurality of first theoretical backlight brightness of the display device corresponding to the light having the plurality of first illuminations, and calculate the backlight compensation coefficient of the display device according to the plurality of first actual backlight brightness and the plurality of theoretical backlight brightness. The backlight compensation coefficient is the brightness compensation coefficient.

For example, in the backlight adjustment system provided by at least one embodiment of the present disclosure, the display device comprises a backlight source, and the backlight coefficient of the display device comprises a duty ratio of the backlight source. The controller of the display device is configured to adjust the duty ratio of the backlight source according to the backlight compensation coefficient, so as to compensate for the backlight brightness of the display device.

For example, in the backlight adjustment system Provided by at least one embodiment of the present disclosure, the control device is further configured to control the light source to emit light having a second illumination; the backlight detection device is configured to detect second actual backlight brightness of the display device under the light having the second illumination; the calculation device is configured to acquire second theoretical backlight brightness of the display device corresponding to the light having the second illumination, and calculate an absolute difference between the second theoretical backlight brightness and the second actual backlight brightness. The controller of the display device is configured to judge whether the absolute difference is greater than a backlight error threshold, and adjust the backlight coefficient of the display device according to the brightness compensation coefficient where the absolute difference is greater than the backlight error threshold.

For example, in the backlight adjustment system provided by at least one embodiment of the present disclosure, the light source is an adjustable light source.

For example, in the backlight adjustment system provided by at least one embodiment of the present disclosure, the display device further comprises a non-volatile storage memory, and the brightness compensation coefficient is stored in the non-volatile memory of the display device.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to keep the following descriptions of the embodiments of the present disclosure clear and concise, the present disclosure omits detailed descriptions of known functions and known components.

A display device having a backlight brightness adjustment function can automatically adjust backlight brightness of a backlight source according to external ambient light, and therefore adjust brightness of a display image. For example, in a situation where the external ambient light is relatively bright, the display device can increase the backlight brightness to make the display image brighter to achieve a better visual effect; conversely, in a situation where the external ambient light is relatively dark, the display device can decrease the backlight brightness, and therefore reduce the overall power consumption of the display device.

The display device having the backlight brightness adjustment function comprises a light sensor. The light sensor can be used to detect the brightness of the ambient light, and the display device can adjust the backlight brightness of the display device according to the brightness of the ambient light.

In an ideal state, a photosensitive formula of a photosensitive component of the light sensor can be expressed as:

$$y=k*x1$$

The formula is a slope intercept formula, where x1 represents the illumination of the ambient light, y represents the illuminance sample value obtained by the photosensitive component, k represents the conversion coefficient of the light sensor under a certain illuminance, and k is expressed as:

$$k=\text{illuminance sample value/illumination of ambient light}$$

In the ideal state, under ambient light with different illuminations, the value of k remains unchanged, and the ratios of the different illuminance sample values obtained by the photosensitive component to the illuminations of ambient light should conform to this conversion coefficient.

For example, in the ideal state, the light sensor is completely exposed to direct irradiation of the ambient light, and in this situation, the correspondence between the illuminance sample value obtained by the photosensitive component of the light sensor and the illumination of the ambient light can be illustrated in Table 1 below.

TABLE 1

| illumination (x1)/lux | actual illuminance sample value (y) | conversion coefficient (k) |
|---|---|---|
| 0 | 0 | 0 |
| 20 | 400 | 20 |
| 40 | 800 | 20 |
| 60 | 1200 | 20 |
| ... | ... | ... |
| 380 | 7600 | 20 |
| 400 | 8000 | 20 |
| 420 | 8400 | 20 |

In the above example, the conversion coefficient k is 20, and the values of k are same under different illuminations.

Figure 1:
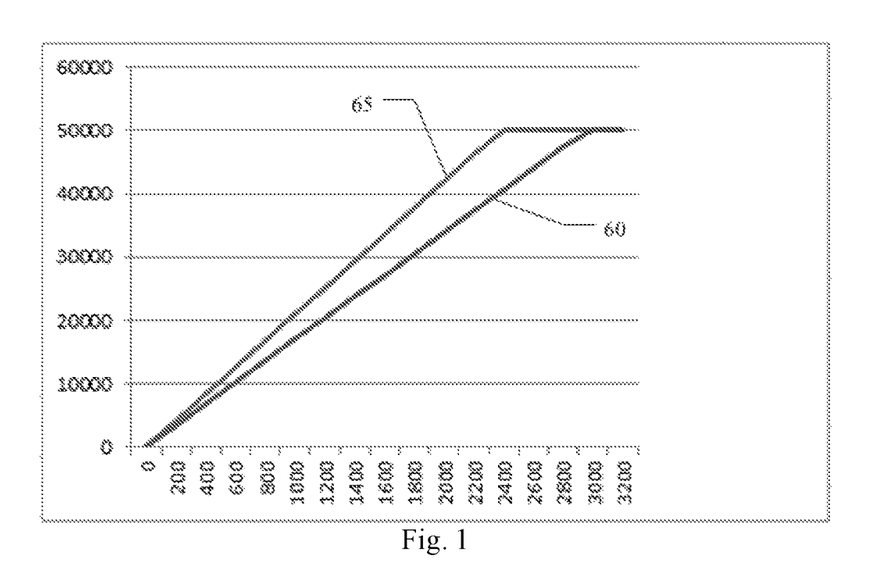
FIG. 1 is a curve graph of ideal illuminance sample values and actual illuminance sample values of a light sensor under different illuminations.

In the ideal state, the actual illuminance sample value y acquired by the photosensitive component is the same as the theoretical illuminance sample value corresponding thereto. However, because of the difference in the photosensitive components of the light sensors or the difference in appearance structures of the light sensors, the actual illuminance sample value y obtained by the photosensitive component is not the same as the theoretical illuminance sample value corresponding thereto. FIG. 1 is a curve graph of ideal illuminance sample values and actual illuminance sample values of a light sensor under different illuminations. As illustrated in FIG. 1, the abscissa represents the illumination of the ambient light, the ordinate represents the illuminance sample value of the light sensor, a curve 60 represents the actual illuminance sample values acquired by the light sensor, and a curve 65 represents the ideal illuminance sample values of the light sensor under different illuminations.

It can be seen from FIG. 1 that under different illuminations, the actual illuminance sample values obtained by the light sensor have a certain loss, and the actual illuminance sample values and the ideal illuminance sample values are different. Therefore, after the backlight brightness adjustment function is turned on, there is a large difference in the brightness of the ambient light acquired by the light sensors of the display devices of different models/batches or the light sensors of different display devices of the same model/batch. Therefore, under the same illuminance of the same light source, the backlight brightness of the display devices of different models or the backlight brightness of different display devices of the same model may be inconsistent after adjustment.

At least one embodiment of the present disclosure provides a backlight adjustment method and a backlight adjustment system, which can adjust the backlight brightness of the display device by a brightness compensation coefficient, so that different display devices of the same model/batch or display devices of different models/batches have the same backlight brightness under the same illuminance of the same light source, so as to reduce the difference in color and brightness among display devices and improve the product production quality.

The backlight adjustment method and the backlight adjustment system provided by the embodiments of the present disclosure are described in detail below with reference to the accompanying drawings.

Figure 2:
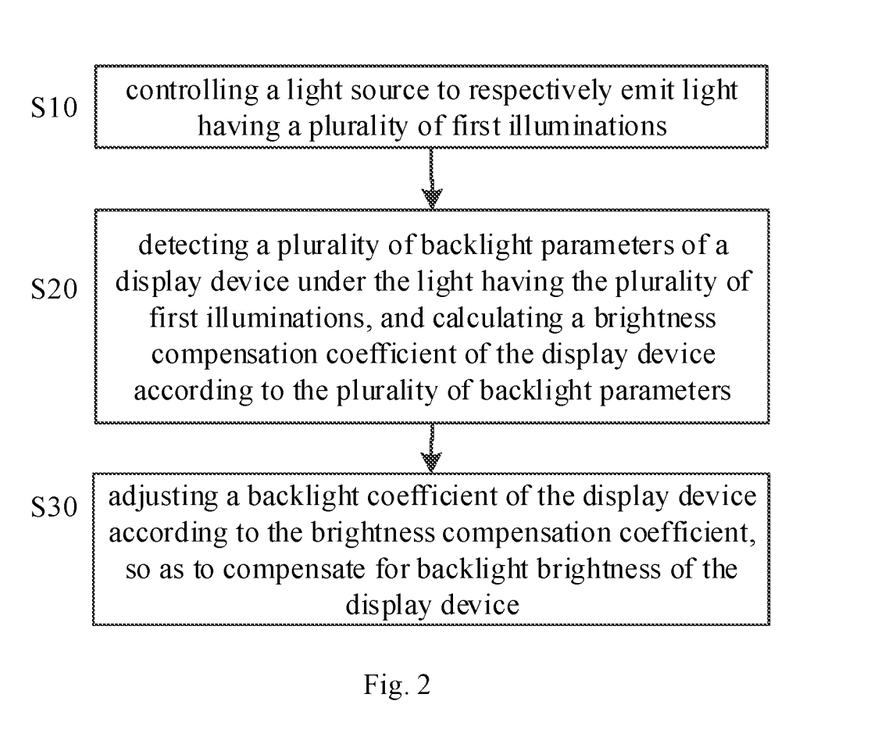
FIG. 2 is a schematic flowchart of a compensation phase of a backlight adjustment method provided by an embodiment of the present disclosure.

FIG. 2 is a schematic flowchart of a compensation phase of a backlight adjustment method provided by at least one embodiment of the present disclosure. The backlight adjustment method can be applied to liquid crystal display devices. As illustrated in FIG. 2, the backlight adjustment method provided by the embodiment of the present disclosure comprises a compensation phase, and the compensation phase can comprise the following operations:

Operation S10: controlling a light source to respectively emit light having a plurality of first illuminations;

Operation S20: detecting a plurality of backlight parameters of a display device under the light having the plurality of first illuminations, and calculating a brightness compensation coefficient of the display device according to the plurality of backlight parameters;

Operation S30: adjusting a backlight coefficient of the display device according to the brightness compensation coefficient, so as to compensate for backlight brightness of the display device.

For example, in the compensation phase, the display device is placed in a dark environment, and then the light emitted by the light source is used as the ambient light. That is, in the operation S10, a first illumination only represents the illumination of the light emitted by the light source, so that the value of the first illumination can be fixed, and the interference of light emitted by other light sources such as natural light (such as sunlight) can be reduced, and the illuminance error can be reduced.

For example, the light source is an adjustable light source, and the brightness can be adjusted as needed. The light source can be a thermoluminescence light source, a gas discharge light source, a solid-state light source, or the like. The embodiments of the present disclosure do not limit this specifically.

For example, in the operation S10, the number of the plurality of first illuminations can be 32, 64, 128, or the like. The plurality of first illuminations can be uniformly distributed, for example, within a certain preset illuminance range. Within the same preset illuminance range, the more the number of the plurality of first illuminations is, the more accurate the obtained brightness compensation coefficient is.

For example, in an example, the number of the plurality of first illuminations is 64, and a difference between the adjacent first illuminations is 20 lux, namely, the preset illuminance range is 0-1260 lux. Therefore, the plurality of first illuminations can be 0 lux, 20 lux, 40 lux, 60 lux, . . . , 1260 lux, respectively. The embodiments of the present disclosure do not limit the number of the first illuminations and the preset illuminance range specifically.

For example, the operation S10 can comprise the following operations: using an illuminance detection device to detect an illumination of current ambient light emitted by the light source; a control device receiving the illumination of the current ambient light detected by the illuminance detection device, and controlling the light source according to the illumination of the current ambient light, so that the light source respectively emits light having the plurality of first illuminations. For example, the illuminance detection device can be calibrated as needed.

The backlight adjustment method provided by the embodiments of the present disclosure can adjust the backlight brightness of the display device by the brightness compensation coefficient, so that different display devices of the same model/batch or display devices of different models/ batches have the same backlight brightness under the same illuminance of the same light source, so as to reduce the difference in color and brightness among display devices and improve the product production quality.

For example, the display device can comprise a light sensor. The light sensor is used to detect the illumination of the ambient light around the display device. The light sensors can be classified into different types such as ambient light sensors, infrared light sensors, solar light sensors, ultraviolet light sensors and so on.

For example, the light sensor comprises a photosensitive component. The photosensitive component can be a photo-resistor, a photodiode, a phototransistor, a silicon photo cell, or the like.

For example, in an example, the backlight adjustment method provided by the embodiments of the present disclosure can compensate the backlight brightness of the display device by a front terminal compensation manner. The operation S20 can comprise, for example, the following operations:

Operation S201: respectively detecting, by the light sensor, a plurality of actual illuminance sample values of the display device under the light having the plurality of first illuminations, the plurality of actual illuminance sample values being the plurality of backlight parameters;

Operation S202: calculating a compensation proportional coefficient of the plurality of first illuminations and the plurality of actual illuminance sample values; and Operation S203: calculating a photosensitive compensation coefficient of the light sensor according to the compensation proportional coefficient and a conversion coefficient of the light sensor, the photosensitive compensation coefficient being the brightness compensation coefficient.

For example, in an example of the operation S201, the number of the plurality of first illuminations is 5, and the plurality of first illuminations are 0 lux, 20 lux, 40 lux, 80 lux, and 120 lux, respectively. For example, Table 2 illustrates test results of the same display device under the plurality of first illuminations. The correspondence among the plurality of first illuminations, the theoretical illuminance sample values, the theoretical backlight brightness, the actual illuminance sample values, and the actual backlight brightness is illustrated in Table 2.

TABLE 2

| illumination (x2)/lux | theoretical illuminance sample value (y1) | theoretical backlight brightness/ nits | actual illuminance sample value (y2) | actual backlight brightness/ nits | backlight brightness after compensation/ nits |
| --- | --- | --- | --- | --- | --- |
| 0 | 0 | 100 | 0 | 100 | 100 |
| 20 | 400 | 140 | 300 | 120 | 140 |
| 40 | 800 | 164 | 598 | 150 | 164 |
| 80 | 1600 | 189 | 1191 | 169 | 189 |
| 120 | 2400 | 203 | 1789 | 183 | 203 |
| . . . | . . . | . . . | . . . | . . . | . . . |

For example, the theoretical backlight brightness and the actual backlight brightness represent values obtained by linearly converting the illuminations of the ambient light by the light sensor.

For example, different light sensors have different conversion coefficients. The conversion coefficient of the light sensor can be expressed as:

$$k = y1/x2$$

Where k represents the conversion coefficient of the light sensor, x2 represents the first illumination, and y1 represents the theoretical illuminance sample value. As illustrated in Table 2, in an example, the conversion coefficient k of the light sensor is 20, and the theoretical illuminance sample values corresponding to the five first illuminations are 0, 400, 800, 1600, and 2400, respectively. Each theoretical illuminance sample value corresponds to a theoretical backlight brightness output. As illustrated in Table 2, the theoretical backlight brightness of the display device corresponding to the theoretical illuminance sample values is 100 nits, 140 nits, 164 nits, 189 nits, and 203 nits, respectively.

Because of the difference in the photosensitive components of the light sensors, the difference in the structures of the light sensors, the difference in the mounting positions of the light sensors, the difference in the mechanisms of the display devices, or the like, the actual illuminance sample values acquired by the light sensor become smaller. For example, in an example, as illustrated in Table 2, the actual illuminance sample values obtained by the light sensor are 0, 300, 598, 1191, and 1789, respectively. The actual backlight brightness of the display device is adjusted according to the actual illuminance sample values acquired by the light sensor, so that the actual backlight brightness of the display device is 100 nits, 120 nits, 150 nits, 169 nits, and 183 nits, respectively. Therefore, there is a difference between the actual backlight brightness of the display device and the theoretical backlight brightness of the display device.

For example, in the operation S202, the compensation proportional coefficients of the plurality of first illuminations and the plurality of actual illuminance sample values are calculated based on the data in table 2. The proportional coefficient corresponding to each actual illuminance sample value can be expressed as follows:

$$m_i = y2_i / x2_i, \; i=1,2,3, \ldots, n$$

Where $m_i$ represents a proportional coefficient corresponding to an i-th actual illuminance sample value, $x2_i$ represents an i-th first illumination, $y2_i$ represents the i-th actual illuminance sample value, and n represents the number of first illuminations. For example, in the example illustrated in Table 2, the number n is 5. The average value of the proportional coefficients corresponding to the plurality of actual illuminance sample values is taken as the compensation proportional coefficient, and the compensation proportional coefficient can be expressed as follows:

$$m_F = (m_1 + m_2 + \ldots + m_n)/n$$

Where $m_F$ represents the compensation proportional coefficient. In the example illustrated in Table 2 above, $m_F$ is approximately equal to 15.

For example, the compensation proportional coefficient can also be calculated by other methods. For example, a least square method is used to fit a curve of the plurality of first illuminations and the plurality of actual illuminance sample values, and the slope of the curve is the compensation proportional coefficient, thereby reducing the error of the compensation proportional coefficient. The embodiments of the present disclosure do not limit the methods for calculating the compensation proportional coefficient.

For example, in the operation S203, the photosensitive compensation coefficient can be expressed as follows:

$$s1 = k/m_F$$

Where s1 represents the photosensitive compensation coefficient, and k represents the conversion coefficient of the light sensor. The photosensitive compensation coefficient is the brightness compensation coefficient. For example, in the example illustrated in Table 2, s=20/15=1.33.

For example, in an example, the backlight coefficient of the display device comprises the conversion coefficient of the light sensor. The operation S30 can comprise: adjusting the conversion coefficient of the light sensor according to the photosensitive compensation coefficient, so as to compensate for the backlight brightness of the display device. That is, the photosensitive compensation coefficient is used to adjust the conversion coefficient of the light sensor, so as to compensate for the actual illuminance sample value of the light sensor, and therefore compensate for the backlight brightness of the display device.

For example, as illustrated in Table 2, the compensated backlight brightness is the same as the theoretical backlight brightness, that is, different display devices have the same backlight brightness under the same illuminance of the same light source.

For example, in the operation S30, the photosensitive compensation coefficient can be written into the display device through the display data channel command interface (DDCCI) of the display device and stored in the display device for use. In the compensation process, the actual illuminance sample value is obtained by the light sensor, and then the actual illuminance sample value is compensated according to the photosensitive compensation coefficient. Therefore, the backlight adjustment method provided by the embodiments of the present disclosure can compensate for the difference in daylighting performances among different display devices, and achieve that different display devices have the same backlight brightness output under the same illuminance.

For example, the photosensitive compensation coefficient (i.e., the brightness compensation coefficient) can be stored in a non-volatile memory (NVM) of the display device, such as a non-volatile memory of a controller (for example, a timing controller T-con). The non-volatile memory refers to a random access memory that can retain data after the system is powered down. Therefore, the photosensitive compensation coefficient can be permanently saved during the working process of the display device. The non-volatile memory comprises, for example, a flash memory, a programmable read only memory (PROM), an erasable programmable read only memory (EPROM), an electrically erasable read only memory (EEPROM), and so on.

For example, in the example of the front terminal compensation manner, the display device can be a liquid crystal display device (LCD), an organic light emitting diode (OLED) display device, or the like.

For example, in another example, the backlight adjustment method provided by the embodiments of the present disclosure can compensate for the backlight brightness of the display device by a back terminal compensation manner. The back terminal compensation manner can make the brightness change of an image more uniform. The operation S20 can comprise, for example, the following operations:

Operation S204: detecting a plurality of first actual backlight brightness of the display device under the light having the plurality of first illuminations, the plurality of first actual backlight brightness being the plurality of backlight parameters;

Operation S205: obtaining a plurality of first theoretical backlight brightness of the display device corresponding to the light having the plurality of first illuminations; and Operation S206: calculating a backlight compensation coefficient of the display device according to the plurality of first actual backlight brightness and the plurality of first theoretical backlight brightness, the backlight compensation coefficient being the brightness compensation coefficient.

For example, in an example of the operation S204, the number of the plurality of first illuminations is 42, and the plurality of first illuminations are 0 lux, 10 lux, 20 lux, 30 lux, . . . , 410 lux, respectively. The difference between the adjacent first illuminations is 10 lux. For example, Table 3 illustrates test results of the same display device under the plurality of first illuminations. The correspondence among the plurality of first illuminations, the first theoretical backlight brightness, and the first actual backlight brightness is illustrated in Table 3.

TABLE 3

| first illumination (x2)/lux | first theoretical backlight brightness (L1)/nits | first actual backlight brightness (L2)/nits |
| --- | --- | --- |
| 0 | 100 | 100 |
| 10 | 116.4583 | 110.54124 |
| 20 | 140.7184 | 135.4567 |
| 30 | 164.9786 | 159.5647 |
| . . . | . . . | . . . |
| 380 | 243.7738 | 238.5678 |
| 390 | 244.6829 | 242.4575 |
| 400 | 245.5691 | 243.2548 |
| 410 | 245.5691 | 245.5691 |

For example, as illustrated in Table 3, first, the relationship between the first illumination and the first theoretical backlight brightness is established in advance according to actual requirements. Then, in the operation S205, a plurality of first theoretical backlight brightness corresponding to the light having the plurality of first illuminations is acquired according to the relationship between the first illumination and the first theoretical backlight brightness.

For example, in the operation S204, the plurality of first actual backlight brightness of the display device under the light having the plurality of first illuminations can be detected by a color analyzer. Because of the difference in the mechanisms of the display devices, or the like, the first actual backlight brightness obtained by the color analyzer becomes small. As illustrated in Table 3, there is a difference between the first actual backlight brightness and the first theoretical backlight brightness.

For example, in the operation S206, the backlight compensation coefficient corresponding to each first actual backlight brightness can be expressed as follows:

$$s2_j = x2_j / L2_j, j=1,2,3, \ldots, n$$

Where $s2_j$ represents a backlight compensation coefficient corresponding to a j-th first actual backlight brightness, $x2_j$ represents a j-th first illuminance, $L2_j$ represents the j-th first actual backlight brightness, and n represents the number of first illuminations. For example, in the example illustrated in Table 3, the number n is 42. The average value of the backlight compensation coefficients corresponding to the plurality of first actual backlight brightness is taken as the brightness compensation coefficient (i.e., the backlight compensation coefficient of the display device). The brightness compensation coefficient can be expressed as follows:

$$s2_F = (s2_1 + s2_2 + \ldots + s2_n)/n$$

Where $s2_F$ represents the brightness compensation coefficient.

It should be noted that the brightness compensation coefficient can also be calculated by other methods.

For example, in the example of the back terminal compensation manner, the display device can be a liquid crystal display device. The liquid crystal display device comprises a backlight source. The backlight source can be, for example, a light emitting diode (LED) backlight source. The backlight coefficient of the display device comprises a duty ratio of the LED backlight source.

For example, the display device can further comprise a backlight driving circuit. The backlight driving circuit is used to adjust the duty ratio of the LED backlight source. For example, the backlight driving circuit can be a driving circuit based on the pulse-width modulation (PWM), and the PWM-based driving circuit is more effective than a constant current driving circuit or a constant voltage driving circuit, thereby improving the efficiency and performance of the LED backlight source.

For example, the operation S30 can comprise: adjusting the duty ratio of the backlight source according to the brightness compensation coefficient, so as to compensate for the backlight brightness of the display device.

For example, a compensated duty ratio is the product of the duty ratio before compensation and the brightness compensation coefficient. If the brightness compensation coefficient is greater than 1, the compensated duty ratio is greater than the duty ratio before compensation, so that the backlight brightness can be increased.

For example, in the operation S30, the brightness compensation coefficient can also be written into the display device through the DDCCI of the display device and stored in the display device for use. In the compensation process, the duty ratio of the backlight source can be adjusted according to the brightness compensation coefficient, thereby compensating for the first actual backlight brightness, so that different display devices have the same backlight brightness output under the same illuminance.

For example, the brightness compensation coefficient can be stored in a non-volatile memory of the display device. For the detailed descriptions of the non-volatile memory, please refer to the above related descriptions, details are not repeated herein again.

Figure 3:
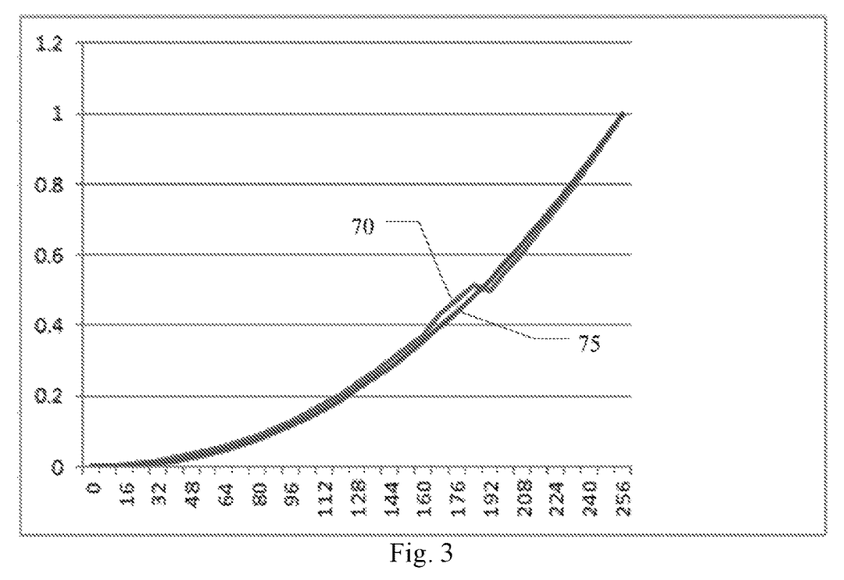
FIG. 3 is a schematic diagram of a backlight brightness curve of a display device after being compensated by a backlight adjustment method provided by an embodiment of the present disclosure.

For example, the back terminal compensation manner can adopt a gamma correction method to perform compensation. The backlight brightness can be divided into 64 levels, and the formula of the standard backlight brightness curve is:

$$Y = (\text{backlight brightness of a corresponding level} / \text{maximum backlight brightness})^{2.2}$$

In the ideal state, the backlight brightness curve is a smooth curve.

FIG. 3 is a schematic diagram of backlight brightness curve of a display device after being compensated by a backlight adjustment method provided by an embodiment of the present disclosure. As illustrated in FIG. 3, a curve 70 is a backlight brightness curve after the compensation performed according to the front terminal compensation manner, and a curve 75 is a backlight brightness curve after the compensation performed according to the back terminal compensation manner. After compensating for the backlight brightness of the display device, the backlight brightness curve approximates a smooth curve.

It should be noted that the backlight adjustment method can compensate for the backlight brightness of the display device by using the front terminal compensation manner and the back terminal compensation manner at the same time.

Figure 4:
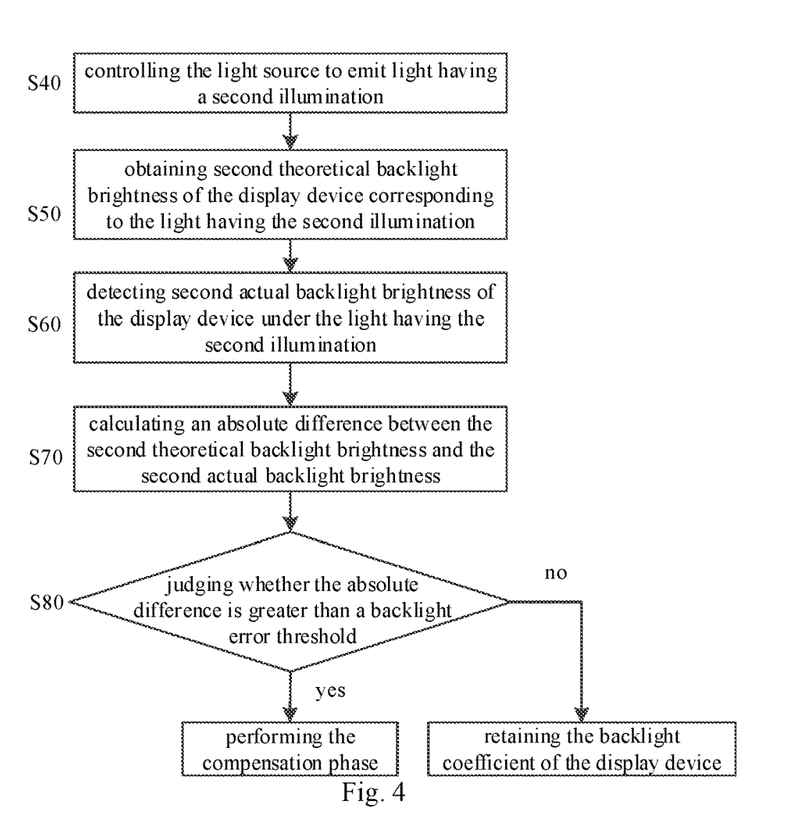
FIG. 4 is a schematic flowchart of a detection phase of a backlight adjustment method provided by an embodiment of the present disclosure.

FIG. 4 is schematic flow diagram of a detection phase of a backlight adjustment method provided by an embodiment of the present disclosure.

For example, as illustrated in FIG. 4, the backlight adjustment method provided by the embodiments of the present disclosure further comprises a detection phase. The detection phase is performed before the compensation phase. For example, the detection phase can comprise the following operations:

Operation S40: controlling the light source to emit light having a second illumination;

Operation S50: obtaining second theoretical backlight brightness of the display device corresponding to the light having the second illumination;

Operation S60: detecting second actual backlight brightness of the display device under the light having the second illumination;

Operation S70: calculating an absolute difference between the second theoretical backlight brightness and the second actual backlight brightness; and Operation S80: judging whether the absolute difference is greater than a backlight error threshold.

For example, in the detection phase, the display device is also in the dark environment and then illuminated by the light source.

For example, in the operation S40, the second illumination and the first illumination can be different, alternatively, the second illumination can be the same as one of the plurality of first illuminations.

For example, in the operation S60, the second actual backlight brightness of the display device under the light having the second illumination can be detected by a color analyzer.

For example, as illustrated in FIG. 4, in the operation S80, in a situation where the absolute difference is greater than the backlight error threshold, the compensation phase is performed; and in a situation where the absolute difference is smaller than the backlight error threshold, the backlight coefficient of the display device is retained.

For example, the backlight error threshold can be 10% of the second theoretical backlight brightness. However, the present disclosure is not limited thereto, the backlight error threshold can be set according to actual requirements, and the embodiments of the present disclosure do not limit this.

For example, in an example, the second illumination is 200 lux. In this situation, the second theoretical backlight brightness of the display device is 200 nits, so that the backlight error threshold can be 10 nits.

Figure 5:
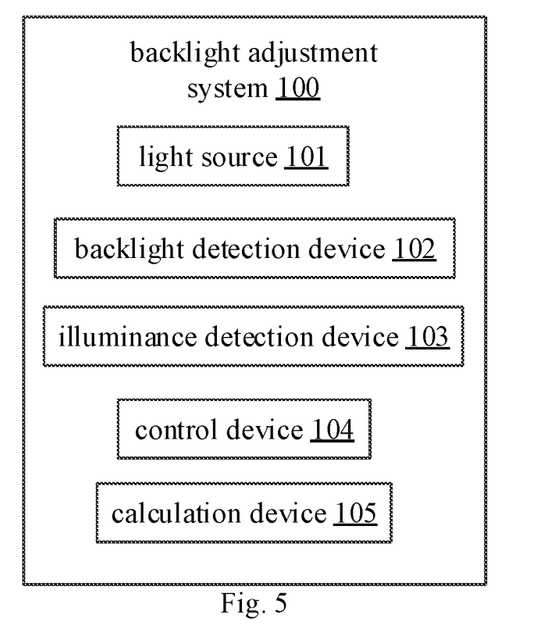
FIG. 5 is a schematic block diagram of a backlight adjustment system provided by an embodiment of the present disclosure.

FIG. 5 is a schematic block diagram of a backlight adjustment system 100 provided by an embodiment of the present disclosure. As illustrated in FIG. 5, the backlight adjustment system 100 provided by the embodiment of the present disclosure can comprise a light source 101, a backlight detection device 102, an illuminance detection device 103, a control device 104, and a calculation device 105. The various components of the backlight adjustment system 100 can be interconnected by a bus system and/or other form of connection mechanism (not shown). It should be noted that the components and structures of the backlight adjustment system 100 illustrated in FIG. 5 are merely exemplary and not limited, and the backlight adjustment system 100 can also have other components and structures as needed.

For example, data can be transmitted among components of the backlight adjustment system 100 via wired or wireless network signals.

For example, in the process of performing the backlight brightness compensation, the illuminance detection device 103 is configured to detect an illumination of the ambient light emitted by the light source 101. The control device 104 is configured to control the light source 101 to respectively emit light having the plurality of first illuminations, according to the illumination of the ambient light detected by the illuminance detection device 103. The backlight detection device 102 is configured to detect a plurality of backlight parameters of the display device under the light having the plurality of first illuminations. The calculation device 105 is configured to calculate a brightness compensation coefficient of the display device according to the plurality of backlight parameters. A controller of the display device is configured to adjust a backlight coefficient of the display device according to the brightness compensation coefficient, so as to compensate for the backlight brightness of the display device.

For example, in the process of performing the backlight brightness compensation, the display device is in a dark environment, that is, the light emitted by the light source is the ambient light, thereby reducing the interference of light emitted by other light sources such as natural light.

For example, the light source 101 is an adjustable light source, and the intensity of the light emitted by the light source 101 can be adjusted as needed.

For example, the illuminance detection device 103 can comprise a component, such as an illuminometer or the like, which can detect the illumination of the ambient light.

For example, the control device 104 and calculation device 105 can be implemented by a firmware, a hardware circuitry, or the like. Of course, the functions of the control device 104 and the calculation device 105 can also be implemented by software or the like. The control device 104 and the calculation device 105 can be implemented, for example, by a central processing unit, a microprocessor, or other forms of processing devices having data processing capabilities and/or program executing capabilities in conjunction with executable instructions.

For example, the control device 104 can comprise a first processor and a first memory. The first processor can execute instructions and data stored in the first memory to implement functions such as controlling the light source 101 to emit light having the plurality of first illuminations, respectively. The calculation device 105 can comprise a second processor and a second memory. The second processor can execute instructions and data stored in the second memory to implement functions such as calculating the brightness compensation coefficient of the display device according to the plurality of backlight parameters.

For example, the control device 104 and the calculation device 105 can be integrated into one whole. For example, the backlight adjustment system 100 can comprise a computer (PC), and the computer can comprise the control device 104 and the calculation device 105, namely the computer can implement the functions of the control device 104 and the functions of the calculation device 105.

The backlight adjustment system 100 provided by the embodiments of the present disclosure can detect the backlight parameters of the display device and calculate the brightness compensation coefficient of the display device according to the backlight parameters, and then adjust the backlight brightness of the display device according to the brightness compensation coefficient, so that different display devices have the same backlight brightness under the same illuminance of the same light source, thereby reducing the difference in color and brightness among display devices, and reducing the poor product specifications.

Figure 6:
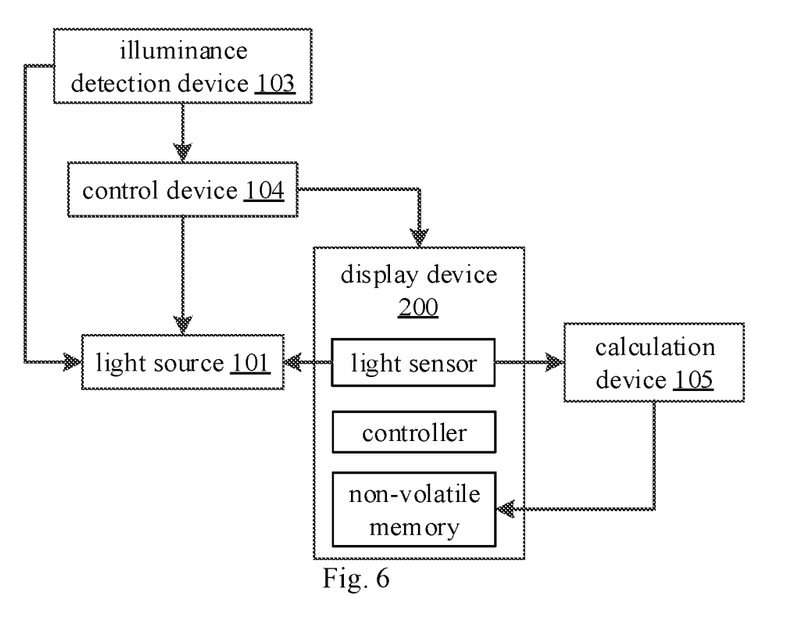
FIG. 6 is a schematic block diagram of a backlight adjustment system provided by an embodiment of the present disclosure for compensating backlight brightness of a display device by a front terminal compensation manner.

For example, in an example, backlight adjustment system 100 can compensate for the backlight brightness of the display device by the front terminal compensation manner. FIG. 6 is a schematic block diagram of a backlight adjustment system provided by an embodiment of the present disclosure for compensating backlight brightness of a display device by a front terminal compensation manner.

As illustrated in FIG. 6, the display device 200 can comprise a light sensor. The backlight detection device 102 can comprise the light sensor. The light sensor is configured to respectively detect a plurality of actual illuminance sample values of the display device under light having a plurality of first illuminations. The plurality of actual illuminance sample values are the plurality of backlight parameters.

For example, the calculation device 105 is further configured to: calculate a compensation proportional coefficient of the plurality of first illuminations and the plurality of actual illuminance sample values; and calculate a photosensitive compensation coefficient of the light sensor according to the compensation proportional coefficient and a conversion coefficient of the light sensor. The photosensitive compensation coefficient can be, for example, the brightness compensation coefficient.

For example, the backlight coefficient of display device 200 can comprise the conversion coefficient of the light sensor. As illustrated in FIG. 6, the display device 200 can further comprise a controller. The controller is configured to adjust the conversion coefficient of the light sensor according to the photosensitive compensation coefficient, so as to compensate for the backlight brightness of the display device. That is, the controller is configured to adjust the conversion coefficient of the light sensor according to the photosensitive compensation coefficient to compensate for the actual illuminance sample value of the light sensor, so as to compensate for the backlight brightness of the display device.

For example, as illustrated in FIG. 6, the display device 200 can further comprise a non-volatile memory. The photosensitive compensation coefficient can be written into the non-volatile memory of the display device 200 through the display data channel command interface (DDCCI) of the display device 200.

For example, in the present example, the display device 200 can be a liquid crystal display device, an electronic paper display device, or the like.

Figure 7:
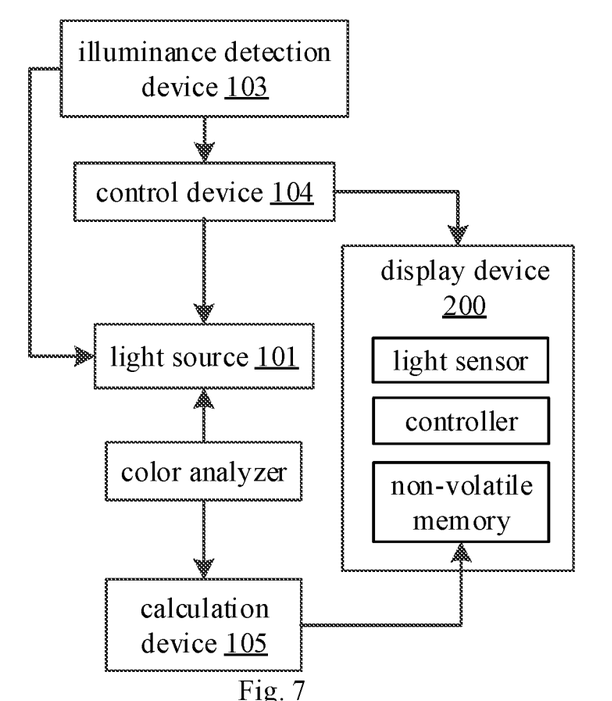
FIG. 7 is a schematic block diagram of a backlight adjustment system provided by an embodiment of the present disclosure for compensating backlight brightness of a display device by a back terminal compensation manner.

For example, in another example, the backlight adjustment system 100 can compensate for the backlight brightness of the display device by a back terminal compensation manner. FIG. 7 is a schematic block diagram of a backlight adjustment system provided by an embodiment of the present disclosure for compensating backlight brightness of a display device by a back terminal compensation manner. As illustrated in FIG. 7, the backlight detection device 102 can comprise a color analyzer, such as a commercially available color analyzer. The color analyzer is configured to detect a plurality of first actual backlight brightness of the display device 200 under the light having the plurality of first illuminations. The plurality of backlight parameters comprises the plurality of first actual backlight brightness.

For example, the calculation device 105 is configured to: acquire a plurality of first theoretical backlight brightness of the display device 200 corresponding to the light having the plurality of first illuminations; receive the plurality of first actual backlight brightness; and calculate the backlight compensation coefficient of the display device according to the plurality of first actual backlight brightness and the plurality of first theoretical backlight brightness. The brightness compensation coefficient of the display device can comprise, for example, the backlight compensation coefficient.

For example, in the present example, the display device 200 can be a liquid crystal display device. The liquid crystal display device can comprise a backlight source. The backlight source can be, for example, a light emitting diode (LED) backlight source. The backlight coefficient of display device 200 comprises a duty ratio of the LED backlight source.

For example, the controller of the display device 200 can comprise a backlight driving circuit. The controller of the display device 200 is configured to control the backlight driving circuit to adjust the duty ratio of the backlight source according to the backlight compensation coefficient, so as to compensate for the backlight brightness of the display device.

For example, the backlight compensation coefficient can be written into the non-volatile memory of the display device through the DDCCI of the display device 200. In the compensation process, the controller of the display device 200 controls the backlight driving circuit to adjust the duty ratio of the backlight source according to the backlight compensation coefficient, so as to compensate for the first actual backlight brightness, so that different display devices have the same backlight brightness output under the same illuminance.

For example, before performing the backlight brightness compensation, the backlight adjustment system can also perform a backlight brightness detection operation to determine whether the backlight brightness of the display device needs to be compensated or not.

For example, in the process of performing the backlight brightness detection, the control device 104 is also configured to control the light source 101 to emit light having a second illumination. The backlight detection device 102 is configured to detect second actual backlight brightness of the display device 200 under the light having the second illumination. The calculation device 105 is configured to acquire second theoretical backlight brightness of the display device 200 corresponding to the light having the second illumination; and calculate an absolute difference between the second theoretical backlight brightness and the second actual backlight brightness. The controller of display device 200 is configured to determine whether the absolute difference is greater than a backlight error threshold. In a situation where the absolute difference is greater than the backlight error threshold, first, the backlight adjustment system calculates the brightness compensation coefficient of the display device 200, and then the controller of the display device 200 adjusts the backlight coefficient of the display device 200 according to the brightness compensation coefficient. In a situation where the absolute difference is smaller than the backlight error threshold, the backlight coefficient of the display device 200 is retained, that is, the backlight brightness of the display device 200 does not need to be compensated.

For example, in the process of the backlight brightness detection, the display device 200 is also in the dark environment.

For example, in the process of the backlight brightness detection, the backlight detection device 102 can comprise a color analyzer.

It should be noted that for detailed descriptions of the conversion coefficient of the light sensor, the first actual backlight brightness, the compensation proportional coefficient, the actual illuminance sample value, the non-volatile memory, the first illumination, the second illumination, the photosensitive compensation coefficient, the backlight compensation coefficient, and the brightness compensation coefficient, and so on, please refer to the related descriptions in the embodiments of the backlight adjustment method, and the repetitions are not described here again.

For the present disclosure, the following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What are described above is related to the illustrative embodiments of the disclosure only and not limitative to the scope of the disclosure; the scopes of the disclosure are defined by the accompanying claims.

What is claimed is:

1. A backlight adjustment method, comprising a compensation phase,
wherein during the compensation phase, a display device is in a dark environment, the compensation phase comprises:
controlling a light source to respectively emit ambient light having a plurality of first illuminations to illuminate the display device;
detecting a plurality of backlight parameters of the display device under illumination of the light having the plurality of first illuminations, and calculating a brightness compensation coefficient of the display device according to the plurality of backlight parameters; and
adjusting a backlight coefficient of the display device according to the brightness compensation coefficient, so as to compensate for backlight brightness of the display device.

2. The backlight adjustment method according to claim 1, wherein the display device comprises a light sensor, and the backlight adjustment method comprises:
respectively detecting, by the light sensor, a plurality of actual illuminance sample values of the display device under illumination of the light having the plurality of first illuminations, the plurality of backlight parameters comprising the plurality of actual illuminance sample values;
calculating a compensation proportional coefficient of the plurality of first illuminations and the plurality of actual illuminance sample values; and
calculating a photosensitive compensation coefficient of the light sensor according to a conversion coefficient of the light sensor and the compensation proportional coefficient, the brightness compensation coefficient comprising the photosensitive compensation coefficient.

3. The backlight adjustment method according to claim 2, wherein
detecting a plurality of first actual backlight brightness of the display device under illumination of the light having the plurality of first illuminations, the plurality of backlight parameters comprising the plurality of first actual backlight brightness;
obtaining a plurality of first theoretical backlight brightness of the display device corresponding to the light having the plurality of first illuminations; and
calculating a backlight compensation coefficient of the display device according to the plurality of first actual backlight brightness and the plurality of first theoretical backlight brightness, the brightness compensation coefficient comprising the backlight compensation coefficient.

4. The backlight adjustment method according to claim 2, further comprising a detection phase before the compensation phase, wherein the detection phase comprises:
controlling the light source to emit light having a second illumination;
obtaining second theoretical backlight brightness of the display device corresponding to the light having the second illumination;
detecting second actual backlight brightness of the display device under the illumination of light having the second illumination;
calculating an absolute difference between the second theoretical backlight brightness and the second actual backlight brightness; and
judging whether the absolute difference is greater than a backlight error threshold, and where the absolute difference is greater than the backlight error threshold, performing the compensation phase.

5. The backlight adjustment method according to claim 2, wherein the backlight coefficient of the display device comprises the conversion coefficient of the light sensor, and the backlight adjustment method comprises:
adjusting the conversion coefficient of the light sensor according to the photosensitive compensation coefficient, so as to compensate for the backlight brightness of the display device.

6. The backlight adjustment method according to claim 1, wherein
detecting a plurality of first actual backlight brightness of the display device under illumination of the light having the plurality of first illuminations, the plurality of backlight parameters comprising the plurality of first actual backlight brightness;
obtaining a plurality of first theoretical backlight brightness of the display device corresponding to the light having the plurality of first illuminations; and
calculating a backlight compensation coefficient of the display device according to the plurality of first actual backlight brightness and the plurality of first theoretical backlight brightness, the brightness compensation coefficient comprising the backlight compensation coefficient.

7. The backlight adjustment method according to claim 6, further comprising a detection phase before the compensation phase, wherein the detection phase comprises:
controlling the light source to emit light having a second illumination;
obtaining second theoretical backlight brightness of the display device corresponding to the light having the second illumination;
detecting second actual backlight brightness of the display device under illumination of the light having the second illumination;
calculating an absolute difference between the second theoretical backlight brightness and the second actual backlight brightness; and
judging whether the absolute difference is greater than a backlight error threshold, and where the absolute difference is greater than the backlight error threshold, performing the compensation phase.

8. The backlight adjustment method according to claim 6, wherein the display device comprises a backlight source, the backlight coefficient of the display device comprises a duty ratio of the backlight source, and the backlight adjustment method comprises:

adjusting the duty ratio of the backlight source according to the backlight compensation coefficient, so as to compensate for the backlight brightness of the display device.

9. The backlight adjustment method according to claim 1, further comprising a detection phase before the compensation phase, wherein the detection phase comprises:

controlling the light source to emit light having a second illumination;

obtaining second theoretical backlight brightness of the display device corresponding to the light having the second illumination;

detecting second actual backlight brightness of the display device under the illumination of light having the second illumination;

calculating an absolute difference between the second theoretical backlight brightness and the second actual backlight brightness; and judging whether the absolute difference is greater than a backlight error threshold, and where the absolute difference is greater than the backlight error threshold, performing the compensation phase.

10. The backlight adjustment method according to claim 1, wherein the brightness compensation coefficient is stored in a non-volatile memory of the display device.

11. A backlight adjustment system, comprising a light source, a backlight detection device, an illuminance detection device, a control device, and a calculation device, wherein in a process of performing backlight brightness compensation on a display device by the backlight adjustment system, the display device is in a dark environment, the illuminance detection device is configured to detect an illumination of light emitted by the light source;

the control device is configured to control the light source to respectively emit ambient light having a plurality of first illuminations to illuminate the display device;

the backlight detection device is configured to detect a plurality of backlight parameters of the display device under the illumination of light having the plurality of first illuminations;

the calculation device is configured to calculate a brightness compensation coefficient of the display device according to the plurality of backlight parameters; and a controller of the display device is configured to adjust a backlight coefficient of the display device according to the brightness compensation coefficient, so as to compensate for backlight brightness of the display device.

12. The backlight adjustment system according to claim 11, wherein the display device comprises a light sensor, and the backlight detection device comprises the light sensor, the light sensor is configured to respectively detect a plurality of actual illuminance sample values of the display device under the illumination of light having the plurality of first illuminations, the plurality of backlight parameters comprises the plurality of actual illuminance sample values;

the calculation device is further configured to:
calculate a compensation proportional coefficient of the plurality of first illuminations and the plurality of actual illuminance sample values; and
calculate a photosensitive compensation coefficient of the light sensor according to a conversion coefficient of the light sensor and the compensation proportional coefficient, the brightness compensation coefficient comprising the photosensitive compensation coefficient.

13. The backlight adjustment system according to claim 12, wherein the backlight coefficient of the display device comprises the conversion coefficient of the light sensor, the controller of the display device is configured to adjust the conversion coefficient of the light sensor according to the photosensitive compensation coefficient, so as to compensate for the backlight brightness of the display device.

14. The backlight adjustment system according to claim 12, wherein the backlight detection device comprises a color analyzer, the color analyzer is configured to detect a plurality of first actual backlight brightness of the display device under illumination of the light having the plurality of first illuminations, the plurality of backlight parameters comprises the plurality of first actual backlight brightness;

the calculation device is configured to acquire a plurality of first theoretical backlight brightness of the display device corresponding to the light having the plurality of first illuminations, and calculate the backlight compensation coefficient of the display device according to the plurality of first actual backlight brightness and the plurality of theoretical backlight brightness; and the brightness compensation coefficient comprises the backlight compensation coefficient.

15. The backlight adjustment system according to claim 12, wherein the control device is further configured to control the light source to emit light having a second illumination;

the backlight detection device is configured to detect second actual backlight brightness of the display device under illumination of the light having the second illumination;

the calculation device is configured to acquire second theoretical backlight brightness of the display device corresponding to the light having the second illumination, and calculate an absolute difference between the second theoretical backlight brightness and the second actual backlight brightness; and the controller of the display device is configured to judge whether the absolute difference is greater than a backlight error threshold, and adjust the backlight coefficient of the display device according to the brightness compensation coefficient where the absolute difference is greater than the backlight error threshold.

16. The backlight adjustment system according to claim 11, wherein the backlight detection device comprises a color analyzer, the color analyzer is configured to detect a plurality of first actual backlight brightness of the display device under the illumination of light having the plurality of first illuminations, the plurality of backlight parameters comprises the plurality of first actual backlight brightness;

the calculation device is configured to acquire a plurality of first theoretical backlight brightness of the display device corresponding to the light having the plurality of first illuminations, and calculate the backlight compensation coefficient of the display device according to the plurality of first actual backlight brightness and the plurality of theoretical backlight brightness; and the brightness compensation coefficient comprises the backlight compensation coefficient.

17. The backlight adjustment system according to claim 16, wherein the display device comprises a backlight source, and the backlight coefficient of the display device comprises a duty ratio of the backlight source, the controller of the display device is configured to adjust the duty ratio of the backlight source according to the backlight compensation coefficient, so as to compensate for the backlight brightness of the display device.

18. The backlight adjustment system according to claim 11, wherein the control device is further configured to control the light source to emit light having a second illumination;

the backlight detection device is configured to detect second actual backlight brightness of the display device under the illumination of light having the second illumination;

the calculation device is configured to acquire second theoretical backlight brightness of the display device corresponding to the light having the second illumination, and calculate an absolute difference between the second theoretical backlight brightness and the second actual backlight brightness; and the controller of the display device is configured to judge whether the absolute difference is greater than a backlight error threshold, and adjust the backlight coefficient of the display device according to the brightness compensation coefficient where the absolute difference is greater than the backlight error threshold.

19. The backlight adjustment system according to claim 11, wherein the light source is an adjustable light source.

20. The backlight adjustment system according to claim 11, wherein the display device further comprises a non-volatile storage memory, and the brightness compensation coefficient is stored in the non-volatile memory of the display device.

* * * * *